United States Patent [19]

Still

[11] Patent Number: 4,592,528

[45] Date of Patent: Jun. 3, 1986

[54] LEG ASSEMBLY FOR A KEYBOARD OR THE LIKE

[75] Inventor: Charles A. Still, Clinton, Mich.

[73] Assignee: Northern Telecom Limited, Montreal, Canada

[21] Appl. No.: 613,061

[22] Filed: May 22, 1984

[51] Int. Cl.[4] .............................................. F16F 15/00
[52] U.S. Cl. .................................... 248/359; 248/456; 248/1
[58] Field of Search .................... 248/359 E, 455, 456, 248/676, 677, 359 C, 649, 291, 457, 1 I; 108/133, 131; 182/225, 155

[56] References Cited

U.S. PATENT DOCUMENTS

| 3,155,362 | 11/1964 | McCall | 248/359 G |
|---|---|---|---|
| 3,361,402 | 1/1968 | Cech | 248/359 G |
| 4,022,414 | 5/1977 | Egger | 248/150 |
| 4,113,212 | 9/1978 | Coriden | 248/455 |
| 4,196,821 | 4/1980 | Teti | 248/291 |
| 4,516,508 | 5/1985 | Kako | 248/456 |

Primary Examiner—Reinaldo P. Machado
Assistant Examiner—Alvin Chin-Shue
Attorney, Agent, or Firm—Schwartz, Jeffery, Schwaab, Mack, Blumenthal & Evans

[57] ABSTRACT

A leg assembly for a keyboard or the like is disclosed. The leg assembly is of relatively simple construction; a leg member, a pivot pin, a stud, a spring, and a C-clip are the components in the preferred embodiment. The leg assembly has two detent positions; in one detent position the leg member is held in a fully retracted position and in the other detent position the leg member is held in a deployed position. In a standard application, two leg assemblies would be employed per keyboard.

9 Claims, 16 Drawing Figures

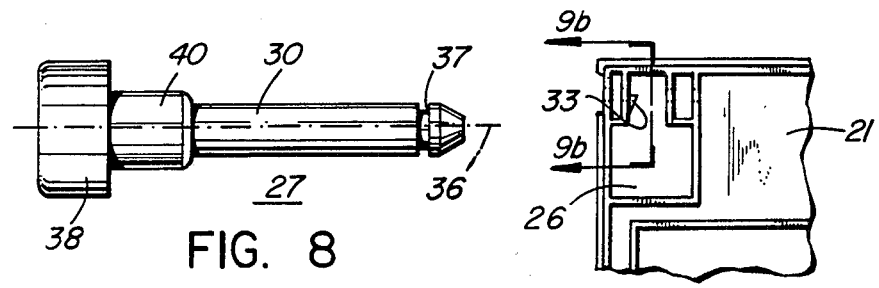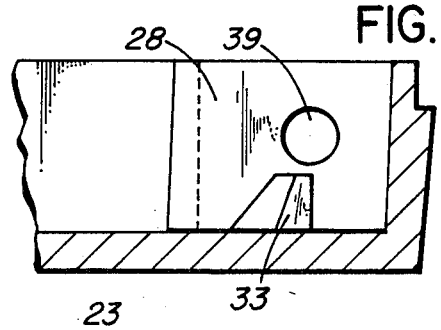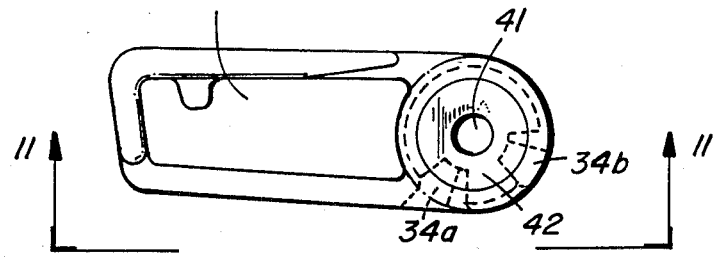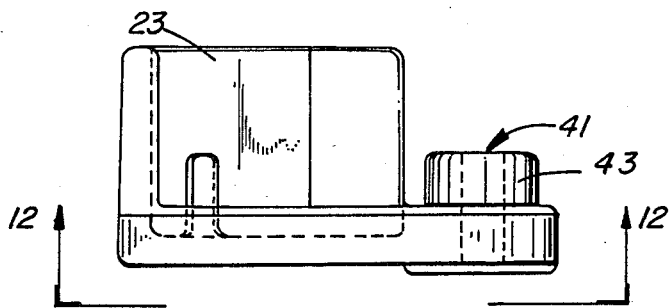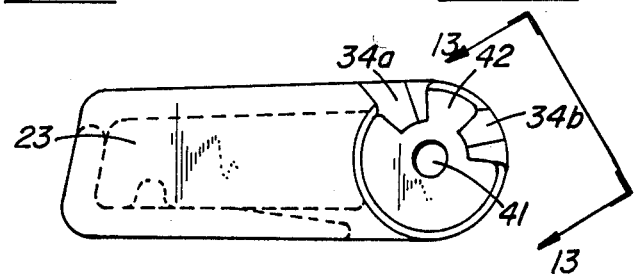

LEG ASSEMBLY FOR A KEYBOARD OR THE LIKE

BACKGROUND OF THE INVENTION

This invention relates generally to retractable legs for keyboards or like devices. More specifically, this invention relates to a retractable leg for a keyboard, or the like, having two detent positions.

It is becoming common practice with the widespread use of computers and computer-like devices, to have a keyboard having a low flat profile. Such a low flat keyboard is particularly useful when there are space constraints involved. One example of a space constraint occurs when a keyboard is employed with a device such as a Displayphone*, wherein the keyboard, when not in use, is slid underneath the Displayphone* base unit. However, when the keyboard is deployed i.e. extracted or removed from underneath the Displayphone base unit, it is desirable that the keyboard not lie perfectly flat. Rather, it is desirable to have the keyboard on an incline with the part of the keyboard close to the operator being in a relatively low position, and that part of the keyboard distant from the operator being in a relatively higher position. In order to accomplish such a position, it is commonplace to employ legs on the rearmost part of the keyboard which may be deployed to raise the back portion of the keyboard and to give such an incline to the keyboard.
*Trademark Drawbacks with such legs, in the prior art, include the fact that such legs are cumbersome to operate; they may have complicated mechanisms which are both expensive to manufacture, and are prone to failure; they may be in awkward places for use; and they may not retract fully into the keyboard, if for example, one should want to work with the keyboard on one's lap.

SUMMARY OF THE INVENTION

The present invention is directed to providing a relatively simple leg assembly, for a keyboard or like device, wherein the leg assembly is simple to use, and retracts fully into the keyboard when not needed.

More specifically, the present invention employs a leg pivotally mounted into a recess on the underside of the keyboard. The leg assembly itself includes a pivot pin for mounting and holding the leg; the leg itself; a spring; and a C-clip for holding the pin to the keyboard. In operation, the leg has three main positions. It has at one extreme, a detent position, wherein the leg is held completely retracted into the keyboard housing itself. It has a second position, wherein the leg is held in a detent position, fully extended at the other extreme. And it has a third position, intermediate the aforementioned two detent positions, wherein it is held biased by spring action such that when the keyboard is lifted off a desk or other supporting member, the spring action is sufficient to deploy the leg into the extracted or deployed position (i.e. second detent position).

Stated in other terms, the present invention is a leg assembly for a keyboard or the like, the assembly having two detent positions and comprising: a leg member for pivotal connection to the keyboard; means for pivotally mounting the leg member to the keyboard; spring means for biasing the leg member away from the keyboard; a stud carried by the keyboard; and indentations on the leg member for mating with the stud, in selected positions of the leg member so as to provide the detent positions.

Stated in yet other terms, the present invention is a leg assembly for being mounted in a recess in a keyboard or the like, the assembly having two detent positions and comprising: a leg member for pivotal connection to the keyboard; the leg member having a first end, containing an aperture by which the leg member can be pivotally mounted, and a second end remote from the first end; a pin, fixed to the keyboard, for engaging the aperture and providing a pivot axis for the leg member; a stud carried by the keyboard and protruding into the recess; two indentations on the leg member for mating with the stud, in two selected positions of the leg member, so as to provide the two detent positions; a coil spring having a central coil portion and two free ends whereby the central coil portion surrounds a portion of the pin with one free end of the coil spring engaging the keyboard and the other free end of the coil spring engaging the leg member, so as both to bias the second end of the leg member away from the keyboard and to bias the leg member toward the stud.

BRIEF DESCRIPTION OF THE DRAWINGS

The present invention will now be described in more detail with reference to the accompanying drawings, wherein like parts in each of the several figures are identified by the same reference character, and wherein:

FIG. 8 depicts the pivot pin of FIGS. 6 and 7;

FIG. 9a is the same as FIG. 6 but with the leg assembly removed so as to better depict the recess into which the leg assembly fits;

FIG. 9b is a sectional view of the recess of FIG. 9a taken through the section line 9b—9b of FIG. 9a;

FIG. 10 is an elevational view of the leg by itself;

FIG. 11 is a view of the leg of FIG. 10 taken through the section line 11—11 of FIG. 10;

FIG. 12 is another view of the leg of FIG. 10 taken through the section line 12—12 of FIG. 11;

DETAILED DESCRIPTION

Figure 1:
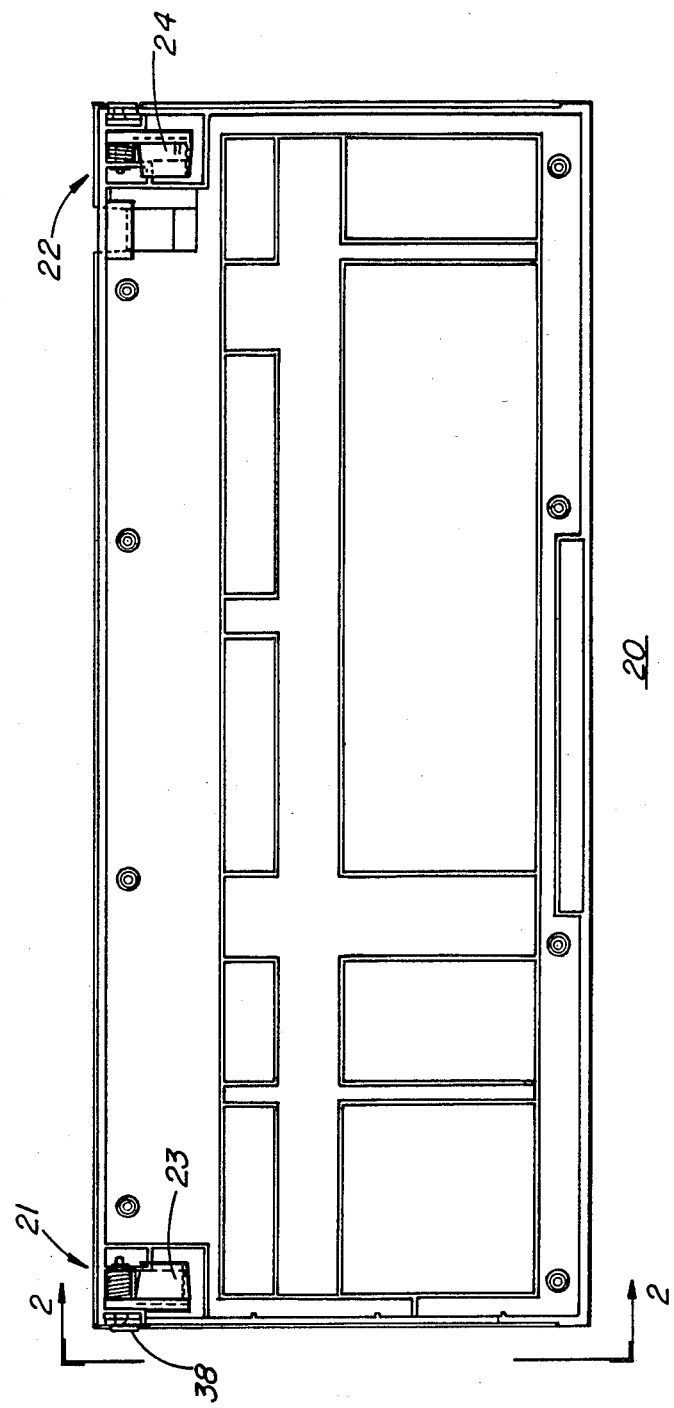
FIG. 1 depicts a simplified view of the underside of a keyboard showing two leg assemblies constructed according to the present invention.

FIG. 1 depicts the underside of keyboard 20, depicting two leg assemblies 21 and 22 constructed according to a preferred embodiment of the present invention.

Figure 2:
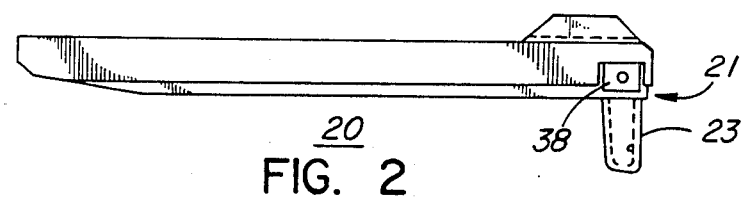
FIG. 2 is a side elevational view of the keyboard of FIG. 1, taken along the section lines 2—2 and inverted such that the FIG. 2 view of the keyboard is in the upright position.

FIG. 2 is taken through the section line 2—2 of FIG. 1 and shows keyboard 20 in profile, and is also inverted from that shown in FIG. 1, so as to show keyboard 20 in its normal or upright position. FIG. 2 also depicts leg member 23 of leg assembly 21, in its fully extended or deployed position. In the view of FIG. 2, leg member 24 of leg assembly 22 is hidden from view.

Figure 3:
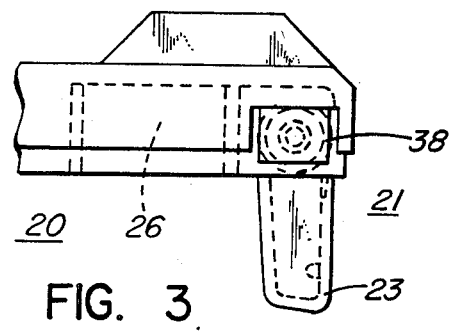
FIG. 3 is similar to FIG. 2 but truncated and depicting the leg portion in more detail and depicting the leg in its deployed position.

FIG. 3 depicts keyboard 20 and leg assembly 21 in more detail and depicts in dotted lines the recess 26 into which leg member 23 can retract. It should be noted that in the FIG. 3 embodiment, leg 23 is in a detent position, as will be explained later in greater detail.

Figure 4:
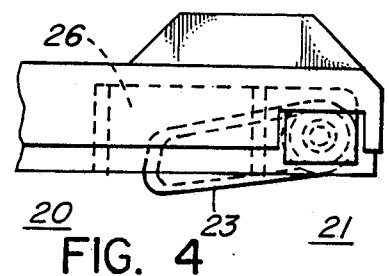
FIG. 4 is as FIG. 3 but depicts the leg in a position intermediate its two detent positions.

FIG. 4 depicts leg assembly 21 in a retracted position. As can be seen from FIG. 4, leg member 23 is approximately flush with the lower surface of keyboard 20, and the remainder of the leg assembly 23 is shown in dashed lines, as it is of course maintained within the recess 26 of keyboard 20. In the position depicted in FIG. 4, leg member 23 is not in a detent position. Rather, leg 23 is simply being held in place by the pressure of keyboard 20 bearing down upon leg member 23. If the keyboard 20 were lifted upward, leg member 23 would be forced down into the extended position of FIG. 3, due to the force of a spring 32, not yet described.

Figure 5:
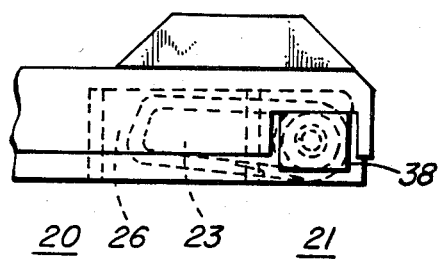
FIG. 5 is also as FIG. 3 but depicts the leg in its fully retracted position.

FIG. 5 depicts keyboard 20, and leg member 23 of leg assembly 21, in its fully retracted and detented position. In the position of FIG. 5, leg member 23 is held fully retracted into recess 26 of keyboard 20. In this position, leg member 23 can be extracted from its detent position by depressing cap 38 as will be described later, in more detail.

Figure 6:
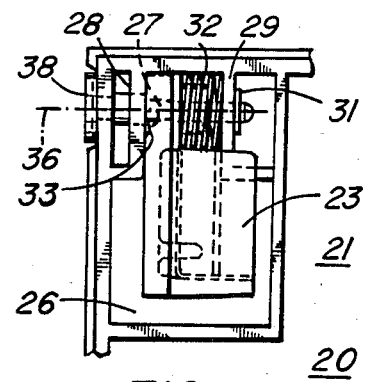
FIG. 6 depicts the leg assembly of the keyboard from the top left of FIG. 1 in more detail.

FIG. 6 depicts leg assembly 21 in more detail. The view in FIG. 6 is from the same angle as is the view in FIG. 1, and leg member 23 is in its retracted and detented position. FIG. 6 depicts pivot pin 27 passing through apertures in walls 28 and 29 of keyboard 20. C-ring 31 maintains pivot pin 27 in position. Leg 23 is mounted in pivoting fashion by pivot pin 27 and is biased by spring 32. Spring 32 will be described later in more detail. Basically, the function of spring 32 is twofold. It biases leg member 23 out of recess 26 into the deployed position as depicted in FIG. 2, and it biases leg member 23 towards wall 28 to provide positive engagement between stud 33 and indentations 34 on leg member 23. Note that stud 33 is carried by wall 28 of keyboard 20, and indentations 34 are provided on leg member 23, so as to provide the detent function of leg 23. This will be described in more detail later in the specification.

Figure 7:
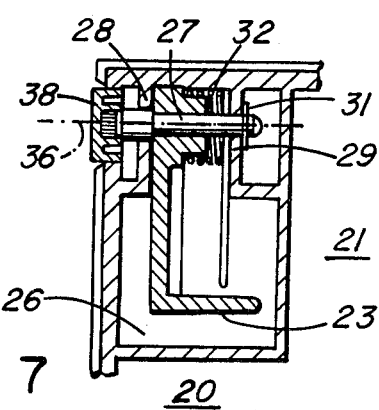
FIG. 7 is the same as FIG. 6 but is a section taken through the axis of the pivot pin.

FIG. 7 is a sectional view of the FIG. 6 view taken through the axis 36 of pivot pin 27. In FIG. 7, leg member 23 is retracted and in a detent position. To release leg member 23 from this position, finger pressure is applied to cap 38. This forces pivot pin 27 to move to the right (in FIG. 7) and shoulder portion 40 of pin 27 engages leg member 23, also causing it to move to the right (in the FIG.) This has the result that indentation 34, on leg member 23, clear stud 33 and leg member 23 is free to move to its deployed position due to the bias force of spring 32.

FIG. 8 depicts pivot pin 27 in more detail. Axis 36 of pin 27 is shown as is notch 37 for receiving C-clip 31. Cap 38 of pivot pin 27 is rectangular in cross-section, as can be seen in FIGS. 2, 3, 4, and 5. Note that shank portion 30 is of smaller diameter than is shoulder portion 40.

FIG. 9a depicts, in more detail, recess 26 of leg assembly 21. As can be seen from FIG. 9a, pivot pin 27, C-ring 31, leg member 23, and spring 32 have been removed, so as to show recess 26 in more detail. In particular, attention is directed to stud 33, which mates with leg member 23 in two of the leg positions, so as to provide the detent position.

FIG. 9b, which is a section taken through the section lines 9b—9b of FIG. 9a, depicts in more detail the relation of stud 33 and the location of the pivot pin 27. Aperture 39 is the aperture through which pivot pin 27 mounts.

FIG. 10 depicts leg member 23 by itself. Leg member 23 has an aperture 41 through which pin 27 passes for mounting leg member 23 to keyboard 20. Also depicted on leg member 23, on the backside and therefore shown in dashed lines, are indentations 34a and 34b referred to collectively as indentations 34 which are used in conjunction with stud 33 to provide the detent positions for leg 23. Note that in the fully retracted position, indentation 34a mates with stud 33, so as to maintain leg 23 in the fully retracted position. In the fully deployed or extended position, notch 34b mates with stud 33 to maintain the detent position. When leg 23 is in the intermediate position as depicted in FIG. 4, the stud 33 is on the land 42 between the indentations 34a and 34b.

FIG. 11 is a view of leg member 23 taken through the section line 11—11 of FIG. 10. As can be seen in FIG. 11, aperture 41 passes completely through flange 43 and the main body of leg 23. Aperture 41, is of course the aperture which receives pin 27 for pivotally mounting leg member 23.

FIG. 12 depicts the view of leg 23 taken along the section lines 12—12 of FIG. 11. FIG. 12 depicts leg member 23, aperture 41, and also shows in more detail indentations 34a and 34b as well as the land 42 between the two indentations.

Figure 13:
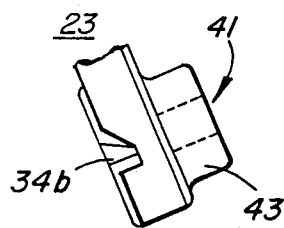
FIG. 13 is a view of a part of the leg taken along the section line 13—13 of FIG. 12.

FIG. 13, taken through the section line 13—13 of FIG. 12 depicts a portion of leg member 23 including aperture 41, flange 43, and indentation 34b.

Figure 14:
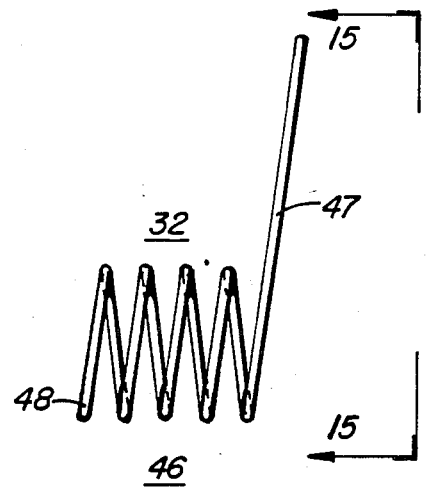
FIG. 14 is one view of the spring employed to deploy the leg.
Figure 15:
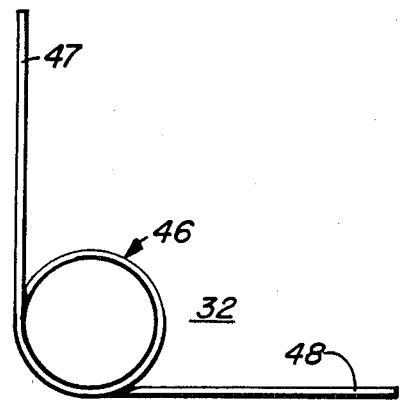
FIG. 15 is another view of the spring taken along the section line 15—15 of FIG. 14.

FIGS. 14 and 15 depict spring 32 in more detail. As can be seen from FIG. 14, spring 32 is a coil spring having a coil portion 46 and terminating in an arm portion 47, and an arm portion 48 which can be seen more clearly in FIG. 15. FIG. 15 is a view taken through the section lines 15—15 of FIG. 14. It also depicts spring 32 having its coil portion 46 and arm portions 47 and 48. It should be noted that spring 32 in FIGS. 14 and 15 is depicted in its uninstalled position. Spring 32 is formed of wire having a diameter of approximately 0.03 inches. The length of the coil portion 46 is approximately ½ inch and the diameter of the coil portion is approximately ⅛ inch.

In the preferrred embodiment of the present invention constructed by the applicant, the length of pivot pin 27 from the outside of cap 38 to the end of the pin, is approximately 1.06 inches. Leg member 23 is approximately 1.38 inches long, is approximately 0.70 inches wide, and is approximately 0.09 inches thick. The diameter of aperture 41 is approximately 0.125 inches, and the diameter of pin 27 in shank portion 30 is approximately 0.124 inches. It should be noted that the maximum torque provided by spring 32 is approximately 5 inch ounces.

What is claimed is:

1. A leg assembly for a keyboard or the like, said assembly having two detent positions and comprising:
   a leg member for pivotal connection to said keyboard;

means for pivotally mounting said leg member to said keyboard;

a stud carried by said keyboard;

indentations on said leg member for mating with said stud, in selected positions of said leg member so as to provide said detent positions; and a coil spring having a central coil portion and two free ends, with one free end of said coil spring engaging said keyboard, and the other free end of said coil spring engaging said leg member, so as both to bias said leg member toward a deployed position away from said keyboard and to bias said leg member toward said stud.

2. The leg assembly of claim 1 wherein said indentations are two in number; a first indentation provides a first detent position so as to hold the leg member in a fully retracted position and a second indentation provides a second detent position so as to hold the leg member in a deployed position.

3. The leg assembly of claim 2 wherein said assembly is mounted in a recess contained in said keyboard such that when said leg member is in a fully retracted position it does not extend beyond the surface of said keyboard, and when said leg member is in said deployed position it extends approximately at right angles to the surface of said keyboard.

4. The leg assembly of claim 2 wherein said means for pivotally mounting is a pin.

5. The leg assembly of claim 2 wherein said means for pivotally mounting is a pin and said pin passes through an aperture near one end of said leg member and the central coil portion of said coil spring surrounds part of said pin, one free end of said coil spring engaging said keyboard, and the other free end of said coil spring engaging said leg member so as to bias the end of said leg member, remote from said aperture, away from said keyboard.

6. A leg assembly for being mounted in a recess in a keyboard or the like, said assembly having two detent positions and comprising:

a leg member for pivotal connection to said keyboard;

said leg member having a first end, containing an aperture by which said leg member can be pivotally mounted, and a second end remote from said first end;

a pin, fixed to said keyboard, for engaging said aperture and providing a pivot axis for said leg member;

a stud carried by said keyboard and protruding into said recess;

two indentations on said leg member for mating with said stud, in two selected positions of said leg member, so as to provide said two detent positions;

a coil spring having a central coil portion and two free ends whereby said central coil portion surrounds a portion of said pin with one free end of said coil spring engaging said keyboard and the other free end of said coil spring engaging said leg member, so as both to bias said second end of said leg member away from said keyboard and to bias said leg member toward said stud.

7. The leg assembly of claim 6 wherein displacement of said pin in a longitudinal direction against the force of said spring biasing said leg member toward said stud, moves said leg member away from said stud such that said leg member pivots about said pin due to the bias action of said spring.

8. The leg assembly of claim 6 wherein said one detent position is with said leg member fully retracted into said recess, and said other detent position is with said leg member in a deployed position.

9. The leg assembly of claim 8 wherein in said deployed position, said leg member extends approximately at right angles to the surface of said keyboard.

* * * * *